US008213966B1

(12) United States Patent
Typrin et al.

(10) Patent No.: US 8,213,966 B1
(45) Date of Patent: Jul. 3, 2012

(54) TEXT MESSAGES PROVIDED AS A COMPLEMENT TO A VOICE SESSION

(75) Inventors: Marcello Typrin, Menlo Park, CA (US); Laura Marino, San Carlos, CA (US); Kyle Oppenheim, Mountain View, CA (US); Susan Jeanne Boyce, Rumson, NJ (US)

(73) Assignee: TellMe Networks, Inc., Mountain View, CA (US)

( * ) Notice: Subject to any disclaimer, the term of this patent is extended or adjusted under 35 U.S.C. 154(b) by 992 days.

(21) Appl. No.: 11/684,720

(22) Filed: Mar. 12, 2007

(51) Int. Cl.
*H04W 4/00* (2009.01)
*H04M 3/42* (2006.01)
*H04M 3/493* (2006.01)
*H04M 3/00* (2006.01)
*H04L 29/06* (2006.01)
*H04L 29/08* (2006.01)

(52) U.S. Cl. .................. 455/466; 455/414.1; 455/414.2; 455/414.3; 455/414.4; 455/418

(58) Field of Classification Search .... 455/414.1–414.4, 455/418, 466
See application file for complete search history.

(56) References Cited

U.S. PATENT DOCUMENTS

| 7,447,636 | B1* | 11/2008 | Schwartz et al. ............. 704/275 |
| 2005/0197110 | A1* | 9/2005 | Hasan et al. .................. 455/417 |
| 2006/0146992 | A1* | 7/2006 | Paden et al. ................. 379/88.01 |
| 2006/0166655 | A1* | 7/2006 | Montemer ................. 455/414.1 |
| 2007/0010266 | A1* | 1/2007 | Chaudhuri .................... 455/466 |
| 2007/0123280 | A1* | 5/2007 | McGary et al. ............... 455/466 |

* cited by examiner

*Primary Examiner* — Nick Corsaro
*Assistant Examiner* — Michael Mapa
(74) *Attorney, Agent, or Firm* — Perkins Coie LLP (57) ABSTRACT

Information may be provided to a caller via text messages as a complement to information provided over a voice interface. In one implementation, a system may receive a request for information over a voice channel from a mobile terminal and respond to the request with text transmitted to the mobile terminal over a text channel.

15 Claims, 6 Drawing Sheets

TEXT MESSAGES PROVIDED AS A COMPLEMENT TO A VOICE SESSION

BACKGROUND

1. Field of the Invention

Implementations described herein relate generally to providing information to a caller and, more particularly, to providing information through a combination of a voice and a text communication channel.

2. Description of Related Art

There are a number of applications in which information is provided to a customer over a voice interface. For example, directory assistance for cellular phone users is commonly provided through an automated or semi-automated interface into which a caller speaks a location and a business name or the name of a person for which the caller would like to obtain a phone or address or other information related to the requested business or person. In response to the caller's request, directory assistance is traditionally provided as audible information provided back to the caller.

A problem with spoken information is that some types of information, such as lists of numbers or addresses, can be difficult for the caller to remember or process in the brief time in which the information is audibly provided. Callers frequently attempt to overcome this by writing down relevant information as it is being spoken. This is not always possible however, such as when the caller does not have pen and paper handy or when the caller is on a mobile phone and possible simultaneously engaged in another activity.

SUMMARY

One aspect is directed to a method that includes receiving a request for information over a voice channel from a mobile terminal and responding to the request with text transmitted to the mobile terminal over a text channel.

Another aspect is directed to a directory assistance system that includes a directory assistance application configured to receive a voice call for directory assistance from a caller. The system also includes a text component configured to provide a directory assistance listing to the caller as text.

Yet another aspect is directed to a method that includes receiving a telephone call from a caller; providing audible information to the caller as part of the telephone call through an automated interactive voice response (IVR) component; audibly offering to provide, during the call, additional information to the user in a textual format; and transmitting the additional information as text to the user when the telephone call has ended.

BRIEF DESCRIPTION OF THE DRAWINGS

The accompanying drawings, which are incorporated in and constitute a part of this specification, illustrate one or more embodiments consistent with the principles of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Overview

Implementations described herein may provide information to a caller via text messages as a complement to information provided over a voice interface. The techniques described herein are particularly applicable to devices, such as mobile terminals, that are designed to facilitate voice communication but that have some ability to communicate with textual information. In one implementation, a caller may initially receive spoken information, such as directory assistance information, over a voice channel. At some point, information supplementary to the spoken information, such as additional directory assistance listings, may be received as textual information.

Exemplary System Configuration

Figure 1:
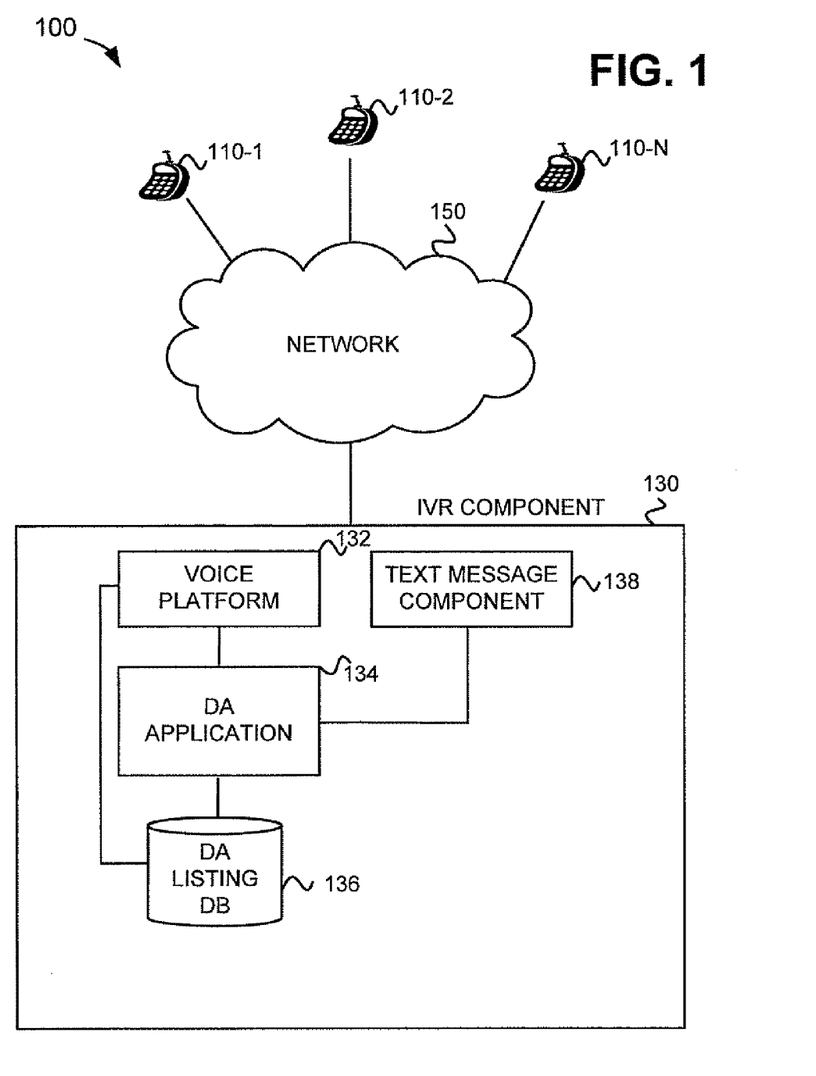
FIG. 1 is a diagram of an exemplary system in which techniques described herein may be implemented.

FIG. 1 is a diagram of an exemplary system 100 in which concepts described herein may be implemented. System 100 may include caller devices 110-1 through 110-N (collectively referred to as "caller devices 110" herein), an interactive voice response (IVR) component 130, and a network 150. Three caller devices 110 and a single IVR component 130 have been illustrated as connected to network 150 for simplicity. In practice, there may be more or fewer caller devices 110 and IVR component(s) 130.

Caller devices 110 may each include any type of mobile communication device, such as a mobile telephone terminal, a portable computer, a personal digital assistant, or another type of mobile device designed to communicate over a voice channel. Caller devices 110 may also include the ability to receive (and potentially send) textual or graphical information. For example, caller devices 110 may be able to receive and display text messages, such as text messages sent as the known Short Message Service (SMS) messages or long SMS messages. Alternate techniques for transmitting textual information, such as transmission of textual information via email may be used in some implementations.

IVR component 130 may provide services to caller devices 110. In one implementation, IVR component 130 may provide directory assistance. IVR component 130 may receive a call from one of caller devices 110, such as caller device 110-1, and provide caller device 110-1 with directory information relating to a business or person in which the caller is interested.

As shown, IVR component 130 may functionally include voice platform 132, directory assistance (DA) application 134, directory assistance (DA) listing database (DB) 136, and text message component 138. While FIG. 1 shows directory assistance application 134, directory assistance listing database 136, and text message component 138 as separate from voice platform 132, in practice, one or more of these elements could be implemented within voice platform 232.

Voice platform 132 may include a combination of hardware and software components to provide voice-related services. In one implementation, voice platform 132 may include a communication or computation device, such as a server computer that may include one or more processing units and/or memory devices. In another implementation, voice platform 132 may include a group of devices either co-located or remotely located to provide the voice-related services. In either implementation, voice platform 132 may include an interface to receive calls from and provide information to callers over network 150.

Directory assistance application 134 may include logic for providing automated or semi-automated directory assistance services. For example, directory assistance application 134 may determine what prompts to provide caller devices 110, locate requested information (e.g., a directory assistance listing) in directory assistance listing database 136, and/or provide instructions for presenting information to one of caller devices 110 and/or for connecting a call from one of caller devices 110 to the party that the caller is interested in contacting.

Directory assistance listing database 136 may include national or local residential, business, and/or government listings. A typical residential, business, or government listing might include the name, address, and/or telephone number of a particular residence, business, or government agency. A business or government listing might also include other specific information, such as hours of communication, movie listings, menu items, products or services provided, or other information that a caller might find useful regarding a listing.

Text message component 138 may include hardware or software for sending text messages to caller devices 110. Text message component 138 may be controlled by directory assistance application 134, which may instruct text message component 138 to send certain text messages to caller devices 110. In one implementation, text message component 138 may send and receive SMS text messages. In an alternate implementation, text message component 138 may send emails instead of text messages.

Network 150 may include a local area network (LAN), a wide area network (WAN), a telephone network, such as the Public Switched Telephone Network (PSTN) or a cellular network, an intranet, the Internet, or a combination of networks. Caller devices 110 and IVR component 130 may connect to network 150 via wired, wireless, and/or optical connections.

Figure 2:
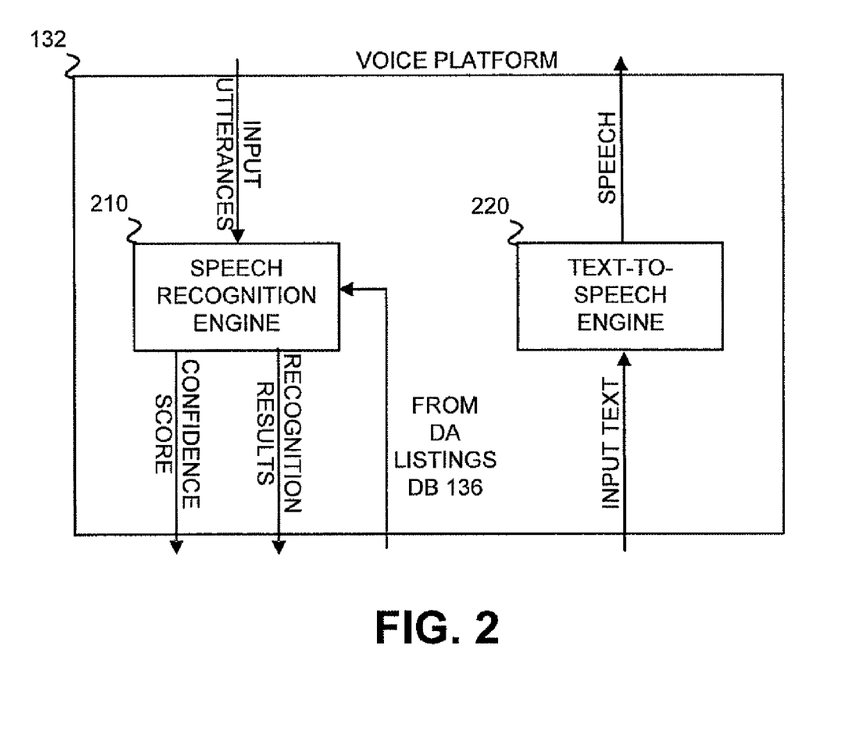
FIG. 2 is a diagram illustrating an exemplary implementation of the voice platform shown in FIG. 1 in additional detail.

FIG. 2 is a diagram illustrating an exemplary implementation of voice platform 132 in additional detail. Voice platform 132 may include speech recognition engine 210 and text-to-speech engine 220.

Speech recognition engine 210 may generally operate to convert utterances from users of caller devices 110 to a textual transcription or a semantic interpretation (i.e., recognition results). An "utterance," as used herein, refers to sound relating to user speech. Speech recognition engines are known in the art and the specific techniques used by speech recognition engine 210 in recognizing utterances will not be described in detail herein. In addition to outputting recognition results corresponding to the input utterance, speech recognition engine 210 may also output a confidence score that acts as a metric of how confident the speech recognition engine is in the recognition results. The confidence score may be, for example, a value between zero and one, with zero indicating the least confidence in the recognition results and one indicating the most confidence in the recognition results. For a given utterance, speech recognition engine 210 may output a number of recognition results, each associated with a confidence score. For example, for the input utterance "hello," speech recognition engine 210 may output the result "hello" with a confidence score 0.98 and the result "jello" with a confidence score of 0.20. In this example, speech recognition engine 210 has determined two possible interpretations of the input utterance. The application receiving the speech recognition results, i.e. directory assistance application 134, may determine which of the recognition results to use in its processing. In this example, because the confidence score for "hello" is much higher than for "jello," the application is likely to assume that the correct result is "hello." Speech recognition engine 210 may be trained based on the entries in directory assistance listing database 136 to specifically recognize input utterances as corresponding to the entries in directory assistance listing database 136.

Text-to-speech engine 220 may convert input text prompts to speech. Text-to-speech engine 220 may be used when it is desired to send information back to the user of one of caller devices 110 over the voice channel. For example, text-to-speech engine 210 may generate spoken prompts in response to input text from directory assistance application 134.

Figure 3:
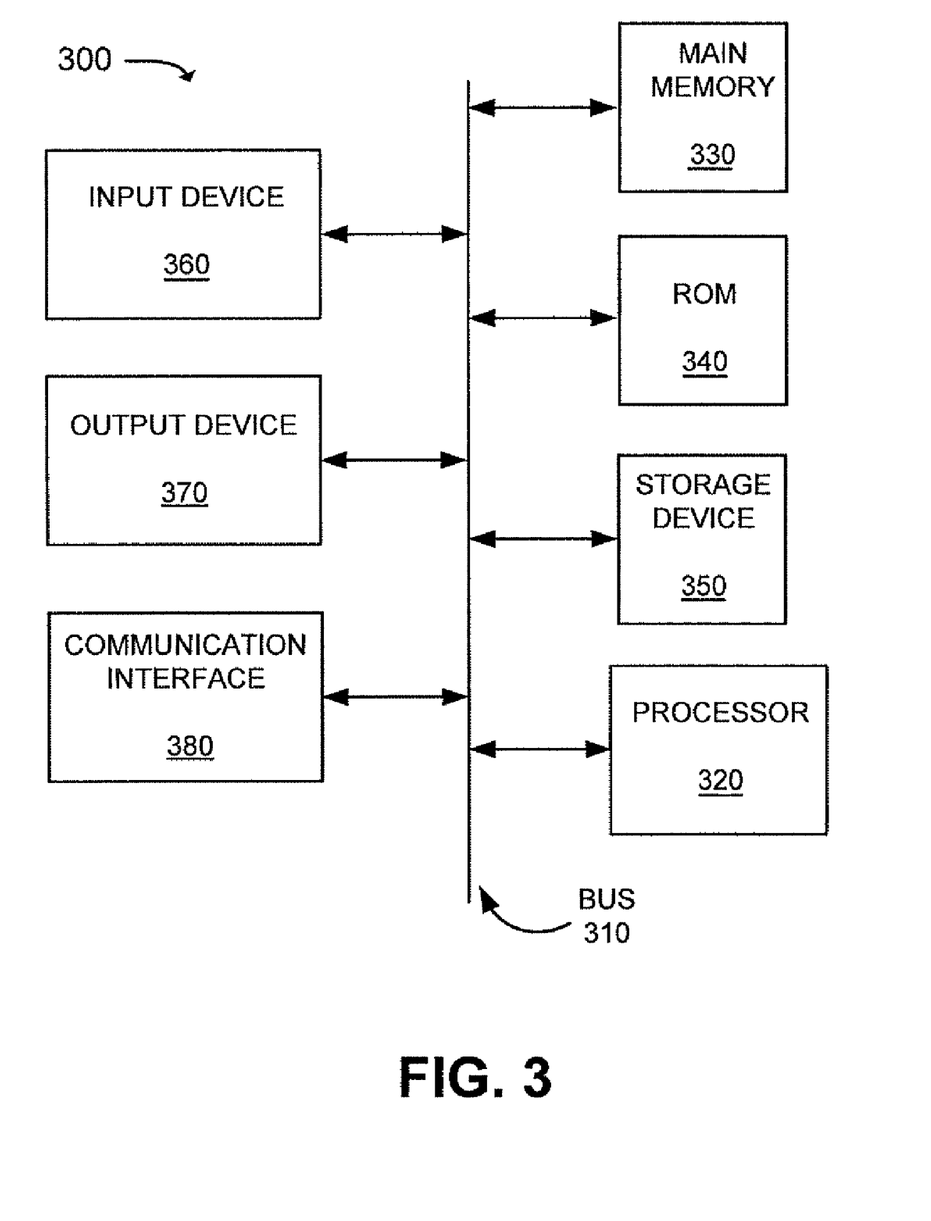
FIG. 3 is a diagram illustrating an exemplary computing device.

FIG. 3 is a diagram illustrating an exemplary computing device 300, such as a computing device used to implement one or more of caller devices 110, speech recognition engine 210, text-to-speech engine 220, text messaging component 138, directory assistance component 134, or directory assistance listing database 136. In some implementations, multiple computing devices 300 may be used to implement speech recognition engine 210, text-to-speech engine 220, text messaging component 138, directory assistance component 134, and/or directory assistance listing database 136.

Computing device 300 may include a bus 310, a processor 320, a main memory 330, a read only memory (ROM) 340, a storage device 350, an input device 360, an output device 370, and a communication interface 380. Bus 310 may include a path that permits communication among the components of computing device 300.

Processor 320 may include any type of processor, microprocessor, or processing logic that interprets and executes instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits a user to input information to computing device 300, such as a keyboard, a mouse, a pen, voice recognition and/or biometric mechanisms, etc. Output device 370 may include a conventional mechanism that outputs information to the user, including a display, a printer, a speaker, etc. Communication interface 380 may include any transceiver-like mechanism that enables computing device 300 to communicate with other devices and/or systems. For example, communication interface 380 may include mechanisms for communicating with another device or system via a network, such as network 150.

Applications executed by computing device 300, such as speech recognition engine 210, text-to-speech engine 220, voice platform 132, text messaging component 138, and directory application 134 may be implemented in software and stored in a computer-readable medium, such as memory 330. A computer-readable medium may be defined as one or more physical or logical memory devices.

The software instructions defining applications executed by computer device 300 may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the present invention. Thus, implementations consistent with the principles of the invention are not limited to any specific combination of hardware circuitry and software.

Exemplary Processing

Figure 4:
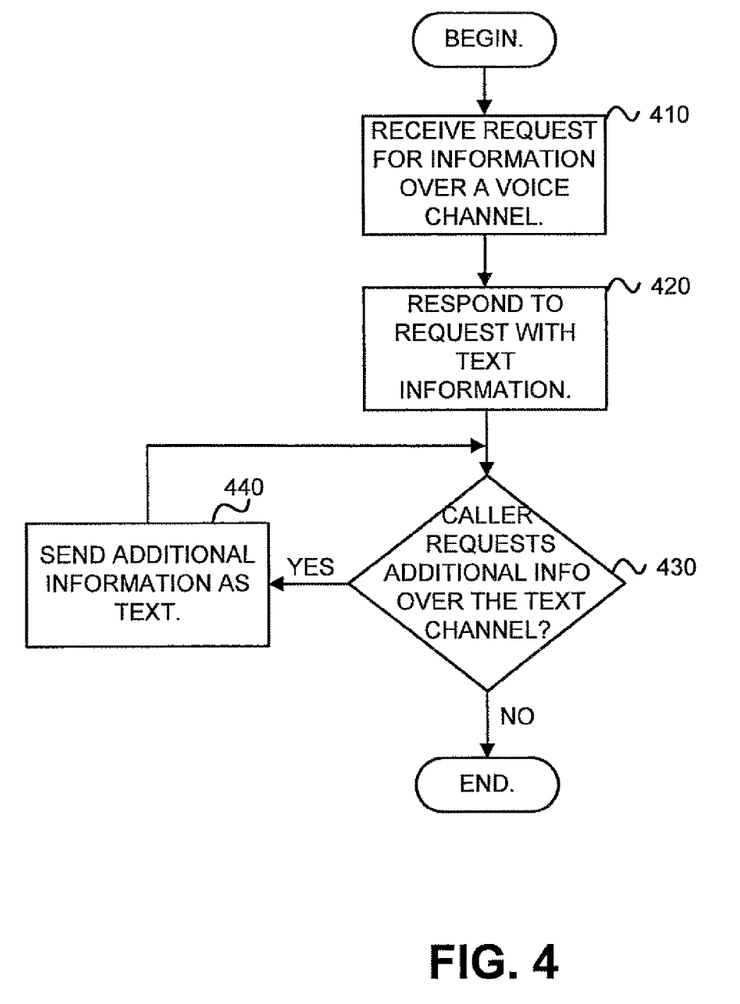
FIG. 4 is a flowchart illustrating exemplary operations performed by the IVR component shown in FIG. 1.

FIG. 4 is a flowchart illustrating exemplary operations performed by IVR component 130. IVR component 130 may receive a request for information over a voice channel (act 410). For example, a caller associated with caller device 110-1 may place a call to directory assistance to obtain assistance in finding the telephone number or address of a business. The directory assistance call may be forwarded to IVR 130, which may be designed to initially handle the call in an automated manner, i.e., without using a human operator. The caller at caller device 110-1 may, for example, in response to prompts generated by directory assistance application 134, state the location and business name in which the user is interested. Directory assistance application 134 may receive a textual version of the business name or an identifier corresponding to the business from speech recognition engine 210. For example, speech recognition engine may recognize what the caller said (e.g., the business corresponding to the caller's speech). The result of the recognition may then be used to look-up the listing information (e.g., business phone number, address, etc.) corresponding to the recognized result.

Directory assistance application 134 may transmit a response to the request from the caller as text information (act 420). For instance, for the above example, directory assistance application 134 may instruct text message component 138 to send listing information for one or more relevant businesses to caller device 110-1 as textual information. The textual information can be delivered, for example, as a SMS text message or an email.

The caller may request additional information, such as additional directory listings, over the text channel (e.g., as an SMS message) (act 430). For instance, the user may respond to the text message with a message that indicates that more listings are desired.

In response to the caller request for additional information, directory assistance application 134 may cause text message component 138 to send additional directory assistance listings over the text channel (act 440).

Figure 5:
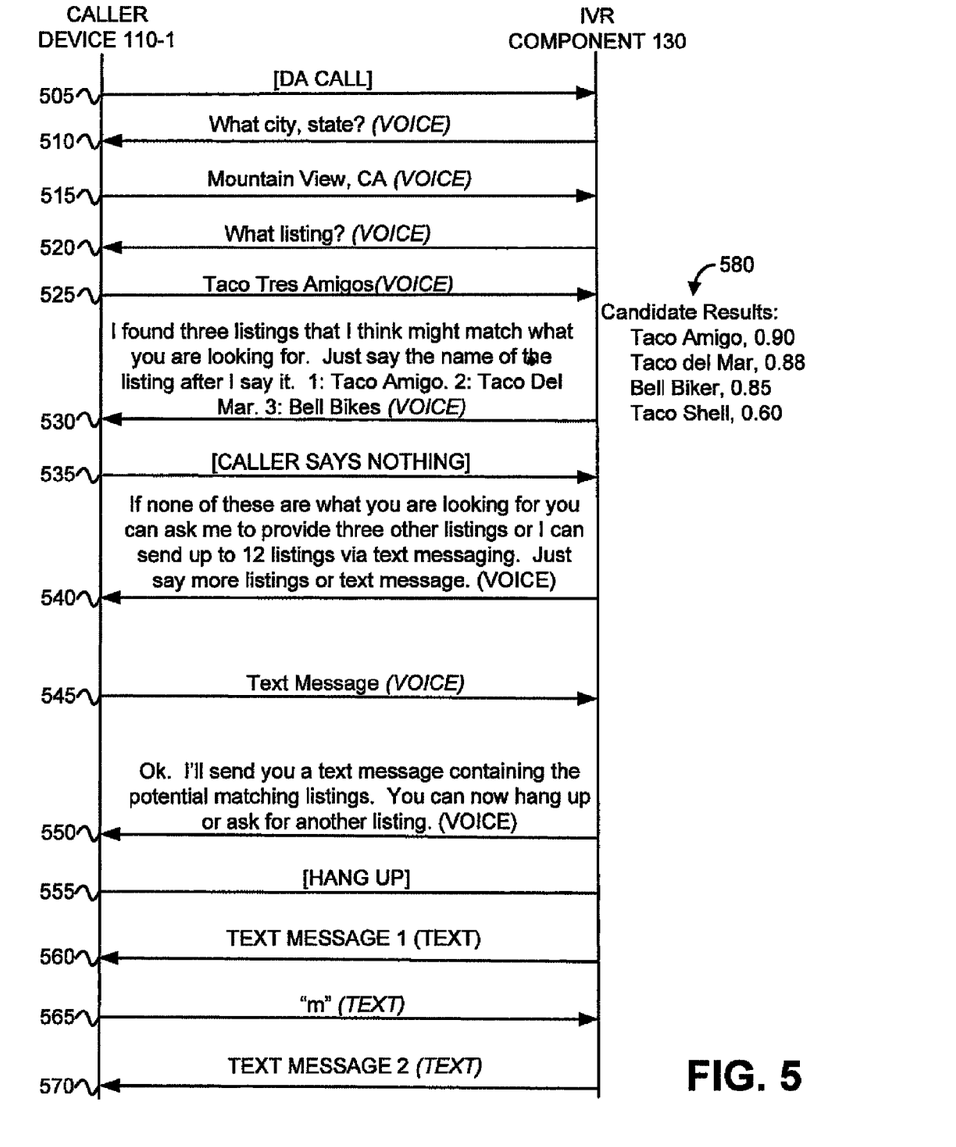
FIG. 5 is a diagram illustrating flow in an exemplary call performed consistent with the operations shown in FIG. 4.

FIG. 5 is a diagram illustrating flow in an exemplary call performed consistent with the operations shown in FIG. 4. Assume for this discussion that a caller device 110-1 would like to place a call for directory assistance. The directory assistance is provided by an automated directory assistance system, such as one implemented by IVR component 130.

The caller may place an initial call for directory assistance, such as by dialing a predetermined directory assistance number, such as 411 (communication 505). Directory assistance application 134 may respond by asking the caller for the city and state in which the caller would like directory assistance (communication 510). This response by directory assistance application 134 may be made over the voice channel of the call, which is indicated in FIG. 5 by "(VOICE)". Assume that the caller responds by saying "Mountain View, Calif." (communication 515). Directory assistance application 134 may receive the caller's response. Assume that speech recognition engine 210, and hence directory assistance application 134, is able to confidently recognize the city and state spoken by the caller. Directory assistance application 134 may then ask for the listing in which the caller is interested (communication 520).

In response to the listing request, assume the user utters "Taco Tres Amigos" (communication 525). Speech recognition engine 210 may processes this utterance and determine that there are a number of possible business listing matches. For example, speech recognition engine 210 may output a set of possible recognition results and associated confidence scores, which directory assistance application 134 may use to generate a list of candidate results. Directory assistance application 134 may sort the list based on the confidence scores to obtain a list of candidate results in which the results that are deemed most likely to be the correct results are near the top of the list.

In some situations, the sorted list of candidate results may contain one result that has a confidence score that is much greater than any other result. In this situation, directory assistance application 134 may simply return this single result to the caller. In the example of FIG. 5, however, assume that a number of candidate results have confidence scores that are clustered near one another at the top of a list of possible results. A portion of such a result list is shown as candidate results list 580, in which each result in list 580 is shown next to its confidence score. That is, as shown in FIG. 5, Taco Amigo has a confidence score of 0.90, Taco del Mar has a confidence score of 0.88, Bell Bikes has a confidence score of 0.85, and Taco Shell has a confidence score of 0.60. The first three results have relatively similar confidence scores relative to one another, indicating uncertainty as to which result is the result intended by the user. In this situation, directory assistance application 134 may transmit a number of the results to the user and allow the user to choose the desired result.

Directory assistance application 134 may respond to the caller by providing the caller with three candidate directory listings (Taco Amigo, Taco Del Mar, and Bell Bikes) (communication 530). If the caller is interested in one of the provided listings, the caller may respond by saying the name of the listing. In this example, however, assume that the caller says nothing or otherwise indicates that the caller is not interested in any of the provided listings (communication 535). In this case, directory assistance application 134 may respond by giving the caller the option to receive more audible listings or to receive a text message containing listings (communication 540). Here, the caller responds by saying "text message," to which directory assistance application 134 responds by telling the caller to hang up so a text message can be sent (communications 545 and 550). In an alternate implementation, it may not be necessary for the caller to hang up before receiving the text message. For example, some mobile terminals are able to receive a text message while the user is simultaneously carrying on a voice call. With such a mobile terminal, text messages may be transmitted to the caller without first asking the caller to hang up and communications 550 and 555 may thus not be necessary.

In response to communication 545, directory assistance application 134, via text message component 138, may send a text message (TEXT MESSAGE 1) to the caller (communications 555 and 560). The text message may contain one or more additional listings. For example, the text message may include the name, address, and phone number of two additional listings, such as:

Taco Shell
555-444-3333
123 Main Street

Taco Fiesta
555-423-3393
123 Pine Street

The text message may also include an option for the caller to receive additional directory listings by responding to the text message. For example, the caller may text message back an "m" (more) for additional listings (communication 565). In response, directory assistance application 134 may send back an additional set of listings (TEXT MESSAGE 2) (communication 570).

When text messaging the first or additional sets of directory listings, directory assistance application 134 may store the phone number and state of the directory assistance session, such as the list of candidate results and which candidate results have been sent. When directory assistance application 134 receives a request for additional listings, such as by receiving the text message "m", directory assistance application 134 may access the stored state information to determine which directory listings to send next to the caller.

Figure 6:
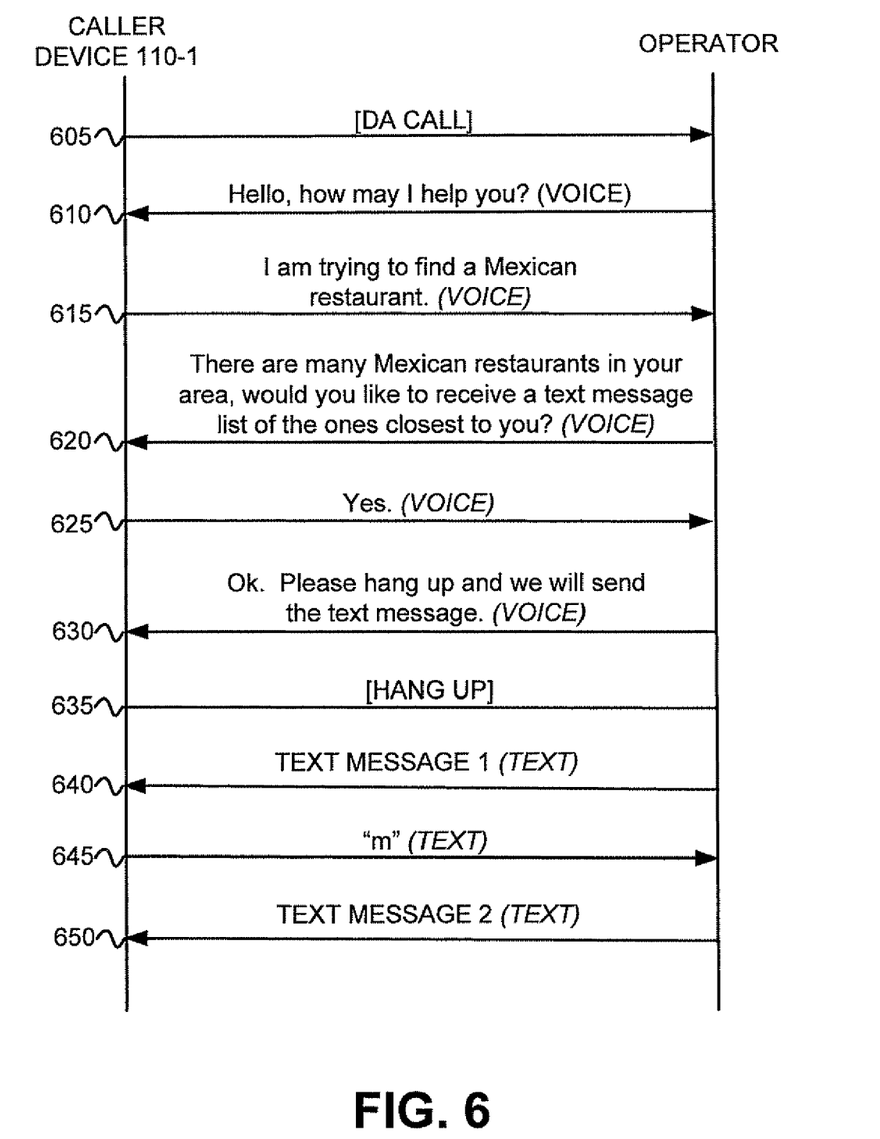
FIG. 6 is a diagram illustrating flow in a second exemplary call performed consistent with the operations shown in FIG. 4

FIG. 6 is a diagram illustrating flow in a second exemplary call performed consistent with the operations shown in FIG. 4. For this example, assume a caller at caller device 110-1 places a call for directory assistance. The directory assistance may be provided by a live operator, or alternatively, may have initially been provided by an automated system but the user may have requested a live operator.

The caller may place the initial call by dialing the predetermined directory assistance number, such as 411 (communication 605). An operator may greet the caller and ask how he/she can be of assistance (communication 610). Assume that the caller responds that he would like to find a Mexican restaurant near his current location (communication 615). The operator may respond by asking the caller whether he/she would like to receive the requested information via text messaging (communication 620). In this example, the caller responds that he/she would like to receive the list as a text message, in which case the caller may hang up (communications 625, 630, and 635). The requested information may then be sent to the caller as a text message (TEXT MESSAGE 1) (communication 640). The text message may contain one or more directory listings. For example, the text message may include the name, address, and phone number of two restaurants near the caller. The text message may also include an option for the caller to receive additional directory listings by responding to the text message. For example, the caller may text message back an "m" (more) for additional listings (communication 645). In response, an additional set of listings may be sent to the caller (TEXT MESSAGE 2) (communication 650).

As with the example discussed with reference to FIG. 5, it may not be necessary for the caller to hang up before receiving the text message. With devices that are capable of receiving text while simultaneously servicing a voice call, communications 635 and 640 may thus not be necessary.

In the examples of FIGS. 5 and 6, the caller provided commands back to IVR component 130 via a text message (e.g., by sending an "m" for more listings). It can be appreciated that other commands could be implemented. For example, in the context of directory assistance, a caller may be allowed to text message a command to initiate completion of a call with a selected list. In this situation, IVR component 130 may call the selected listing and then forward or bridge the call back to the caller.

Providing text information to complement a voice call, as described above, may provide for a number of advantages to the user call experience. In particular, asking a caller to process or select from a long list of options provided audibly to the caller can overload the caller. Giving the caller the option to view the list as text and at their own pace may be preferred by many callers. In addition, a caller may simply prefer to have the requested information as text, which may be easily saved and viewed or searched at a later date.

Additionally, because text messaging is widely supported by many mobile telephone vendors and service providers, using text messages to deliver additional information to a caller can be implemented with no additional software or hardware upgrades for many callers (i.e., users are not required to purchase a new phone or install new software on their existing phone)

Although the above examples for FIGS. 5 and 6 were primarily discussed in the context of directory assistance, the techniques described herein are not necessarily limited to directory assistance. For example, product information, movie listings, weather information, sports score information, or other types of information may be provided over a voice channel that provides an option to receive additional information as text.

CONCLUSION

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIG. 4, the order of the acts may be modified in other implementations consistent with the principles of the invention. Further, non-dependent acts may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the communication and behavior of the aspects were described without reference to the specific software code—it being understood that one of ordinary skill in the art would be able to design software and control hardware to implement the aspects based on the description herein.

Further, certain portions of the invention may be implemented as "logic" or as a "component" that performs one or more functions. This logic or component may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a directory assistance application implemented by an interactive voice response component, the method, comprising:

receiving a request for directory listings over a voice channel from a mobile terminal;

transmitting, by a messaging component comprised in the interactive voice response component, to the mobile terminal, text including an option for the mobile terminal to receive additional directory listings;
wherein, the messaging component in the interactive voice response component transmits the text to communicate with a user of the mobile terminal to satisfy the request for directory listings;
determining which additional directory listings to send;
initially responding to the request for with audible information;
responding to the request with additional text information when the user of the mobile terminal indicates that the additional directory listings should be transmitted as text;
providing, by the messaging component, the additional directory listings to the mobile terminal.

2. The method of claim 1, further comprising, responding to the request by:
audibly instructing, over the voice channel, the user of the mobile terminal to hang up; and
transmitting the text as a Short Message Service (SMS) text message in response to the user hanging up.

3. The method of claim 2, further comprising:
receiving a text message back from the user of the mobile terminal, the text message back from the user including a command from the user.

4. The method of claim 1, wherein the additional information is stored in association with a phone number of the user.

5. The method of claim 1, wherein the text is transmitted as an email.

6. A method performed by an interactive voice response (IVR) component, the method, comprising:
receiving a telephone call from a user;
providing audible information to the user as part of the telephone call through the interactive voice response (IVR) component;
audibly offering to provide, by a text message component comprised in the interactive voice response component, during the call, additional information to the user in a textual format;
wherein, the messaging component in the interactive voice response component transmits the text to communicate with a user of the mobile terminal to satisfy the request for the directory listings;
storing an indication including an identification of information that has been previously transmitted to the user;
determining which additional information to send next to the user by accessing the indication that has been stored;
initially responding to the request for with audible information;
responding to the request with additional text information when the user of the mobile terminal indicates that the additional information including the additional directory listings should be transmitted as text;
transmitting, by the text message component, the additional information as text to the user.

7. The method of claim 6, wherein the text is transmitted to the user as a Short Message Service (SMS) text message.

8. The method of claim 6, further comprising:
receiving a text message from the user that defines requests from the user for additional information relating to the telephone call.

9. The method of claim 8, wherein the received telephone call includes a call for directory assistance.

10. A system for providing directory assistance, comprising:
an interactive voice response component comprising a processor which is configured to:
receive an audible request for directory listings from a user;
identifies a set of candidate recognition results and associated confidence scores based on the audible request;
initially responds to the request for with audible information;
responds to the request with additional text information when the user of the mobile terminal indicates that any additional information including additional directory listings should be transmitted as text;
the interactive voice response component further comprising a text message component,
wherein, the text message component transmits text to the mobile terminal over a text channel in response to the audible request for the directory listings;
wherein, the text presents directory listings from the set of candidate recognition results based on the associated confidence scores.

11. The system of claim 10, wherein the text is transmitted to the user as a Short Message Service (SMS) text message.

12. The method of claim 10, wherein, the text further includes an option for the mobile terminal to receive additional directory listings by responding to the text.

13. The method of claim 12, wherein, the interactive voice response component:
stores an indication of information including an identification of directory listings that have been previously transmitted to the user;
determines which additional directory listings to send next to the user by accessing the indication of information that has been stored.

14. The method of claim 1, wherein the text is transmitted as a Short Message Service (SMS) text message.

15. The method of claim 1, further comprising,
storing an indication of information including an identification of directory listings that have been previously transmitted to the user;
determining which additional directory listings to send next to the user by accessing the indication of information that has been stored.

* * * * *